United States Patent
An et al.

(10) Patent No.: US 10,042,216 B2
(45) Date of Patent: Aug. 7, 2018

(54) ARRAY SUBSTRATE AND MANUFACTURING METHOD THEREOF, LIQUID CRYSTAL PANEL AND LIQUID CRYSTAL DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yang An, Beijing (CN); Wukun Dai, Beijing (CN); Zhilong Peng, Beijing (CN); Huanping Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 34 days.

(21) Appl. No.: 15/173,883

(22) Filed: Jun. 6, 2016

(65) Prior Publication Data
US 2016/0363824 A1    Dec. 15, 2016

(30) Foreign Application Priority Data
Jun. 9, 2015 (CN) .......................... 2015 1 0314353

(51) Int. Cl.
G02F 1/1362    (2006.01)
G02F 1/1343    (2006.01)
(Continued)

(52) U.S. Cl.
CPC ...... G02F 1/134309 (2013.01); G02F 1/1343 (2013.01); G02F 1/1362 (2013.01);
(Continued)

(58) Field of Classification Search
CPC ......... G02F 1/134309; G02F 1/133514; G02F 1/1343; G02F 1/1362
See application file for complete search history.

(56) References Cited

U.S. PATENT DOCUMENTS

2002/0135722 A1    9/2002    Lee
2009/0207362 A1*   8/2009    Nagano ............ G02F 1/134363
                                                    349/139
(Continued)

FOREIGN PATENT DOCUMENTS

CN    1341231 A    3/2002
CN    1377020 A    10/2002
(Continued)

OTHER PUBLICATIONS

The First Chinese Office Action dated Apr. 27, 2017; Appln. No. 201510314353.3.
(Continued)

Primary Examiner — Anne Hines
(74) Attorney, Agent, or Firm — Ladas & Parry LLP

(57) ABSTRACT

An embodiment of the present disclosure discloses an array substrate, including a base substrate, a drain electrode of a thin film transistor and a pixel electrode corresponding to the drain electrode arranged on the base substrate, wherein the pixel electrode and the drain electrode are attached to each other.

10 Claims, 2 Drawing Sheets

(51) Int. Cl.
*G02F 1/1335* (2006.01)
*G02F 1/1368* (2006.01)
(52) U.S. Cl.
CPC ...... *G02F 1/1368* (2013.01); *G02F 1/133514* (2013.01); *G02F 1/136286* (2013.01); *G02F 2201/121* (2013.01); *G02F 2201/123* (2013.01)

(56) References Cited

U.S. PATENT DOCUMENTS

| | | |
|---|---|---|
| 2012/0138938 A1 | 6/2012 | Bae et al. |
| 2014/0063429 A1 | 3/2014 | Huh et al. |
| 2014/0339542 A1 | 11/2014 | Yamazaki et al. |
| 2015/0179669 A1 | 6/2015 | Qin et al. |

FOREIGN PATENT DOCUMENTS

| | | |
|---|---|---|
| CN | 102403311 A | 4/2012 |
| CN | 102486917 A | 6/2012 |
| CN | 103227148 A | 7/2013 |
| CN | 103676348 A | 3/2014 |
| EP | 1168054 A1 | 1/2002 |
| TW | 201501318 A | 1/2015 |

OTHER PUBLICATIONS

The Second Chinese Office Action dated Oct. 24, 2017; Appln. 201510314353.3.

\* cited by examiner

ARRAY SUBSTRATE AND MANUFACTURING METHOD THEREOF, LIQUID CRYSTAL PANEL AND LIQUID CRYSTAL DISPLAY DEVICE

TECHNICAL FIELD

Embodiments of the present disclosure relate to an array substrate and a manufacturing method thereof, a liquid crystal panel and a liquid crystal display device.

BACKGROUND

Due to advantages of low power consumption, no radiation and the like, a liquid crystal display device has played a leading role in a field of flat panel display.

A liquid crystal panel in a related liquid crystal display device generally comprises an array substrate and a color filter substrate opposite to each other, as well as a liquid crystal layer filled between the array substrate and the color filter substrate, wherein, the array substrate is provided with a plurality of thin film transistors and a plurality of pixel electrodes. The pixel electrodes are connected with drain electrodes of the thin film transistors respectively. A common electrode corresponding to the pixel electrodes are arranged on the color filter substrate. When the pixel electrode is charged by the thin film transistors, an electric field is formed between the pixel electrode and the common electrode, thus controlling liquid crystal molecules in a liquid crystal region of the pixel electrode to deflect and further realizing a liquid crystal display function.

In an array substrate of prior art, a passivation layer between the pixel electrodes and the drain electrodes of the thin film transistors, and the pixel electrodes are electrically connected with the drain electrodes through via holes in the passivation layer, thus making the thin film transistors charge the pixel electrodes by the drain electrodes.

However, in a relevant production process of an array substrate, a phenomenon that the via holes in the passivation layer are too small or irregular in size frequently occurs, such that there is relatively large resistance of connecting positions between the pixel electrodes and the drain electrodes, thus causing a lower charging efficiency to the pixel electrodes by the thin film transistors and deteriorating liquid crystal display.

SUMMARY

An embodiment of the present disclosure provides an array substrate, including a base substrate, a drain electrode of a thin film transistor and a pixel electrode corresponding to the drain electrode arranged on the base substrate, wherein the pixel electrode and the drain electrode are attached to each other.

Another embodiment of the present disclosure provides a manufacturing method of the array substrate according to claim 1, including: forming a drain electrode of a thin film transistor on a base substrate; and forming a pixel electrode the drain electrode, corresponding to the drain electrode, so that the pixel electrode and the drain electrode are attached to each other.

Yet another embodiment of the present disclosure provides a liquid crystal panel, including the array substrate provided by the above embodiment.

Yet another embodiment of the present disclosure provides a liquid crystal display device, including the liquid crystal panel provided by the above embodiment.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

The technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Embodiments of the disclosure provide an array substrate and a manufacturing method thereof, a liquid crystal panel and a liquid crystal display device, capable of solving a problem of a lower charging efficiency to pixel electrodes by thin film transistors caused by relatively large resistance at connecting positions between the pixel electrodes and drain electrodes.

Figure 1:
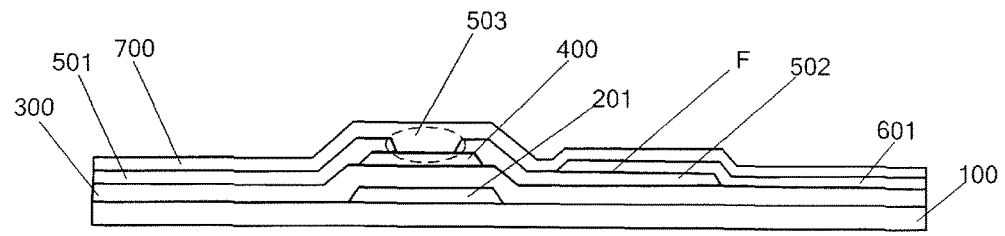
FIG. 1 is a structural schematic diagram of a partial section of an array substrate according to an embodiment of the present disclosure.

Referring to FIG. 1, an embodiment of the present disclosure provides an array substrate, comprising a base substrate 100 and a plurality of functional layers laminated on the base substrate 100. The functional layers include a source-drain metal layer and a pixel electrode layer. The source-drain metal layer and the pixel electrode layer are sequentially laminated on the base substrate 100; the source-drain metal layer includes a plurality of drain electrodes 502, and the pixel electrode layer includes a plurality of pixel electrodes 601 corresponding to the drain electrodes 502 respectively; the corresponding pixel electrode 601 and the drain electrode 502 are attached to each other, and the pixel electrode 601 are driven by thin film transistor where the corresponding drain electrode 502 are located.

In the array substrate with the above arrangement, no functional layer presents between the pixel electrode 601 and the drain electrode 502, in a direction perpendicular to the base substrate. Compared with a prior art in which the drain electrode 502 and the pixel electrode 601 are electrically connected through a via hole in the passivation layer, the drain electrodes 502 and the pixel electrodes 601 in the embodiment of the present disclosure are directly attached to each other for electrically connection, instead of being electrically connected through the via holes in the passivation layer. Thus, a problem that the via hole IS too small or irregularly shaped does not exist. Therefore, the embodiment of the present disclosure can avoid a phenomenon of too large resistance of electrically connected member between the drain electrodes 502 and the pixel electrodes 601 due to too small or irregularly shaped via holes on the passivation layer. In this case, when the thin film transistor charge the pixel electrode 601, electric energy provided by the thin film transistor will not be massively consumed by the resistance of the electrically connected positions, thus avoiding a problem of lower charging efficiency of the thin film transistors to the pixel electrodes 601 caused by the too large resistance of the electrically connecting member so as to prevent a poor influence on liquid crystal display.

In an example, the drain electrodes 502 correspond to the pixel electrodes 601 in one-to-one correspondence. However, the embodiment of the present disclosure is not limited thereto. In another example, the drain electrodes 502 do not correspond to the pixel electrodes 601 in one-to-one correspondence. For example, excessive drain electrodes 502 or pixel electrodes 601 present; or, one drain electrode 502 corresponding a plurality of pixel electrodes 601; or, one pixel electrode 601 corresponding to a plurality of drain electrodes 502. The above different corresponding relationships are related to specific arrangement of the array substrate, and have no influence on achieving aims of the embodiments of the present disclosure. Therefore, the embodiments of the present disclosure do not specifically limit the corresponding relationships between the drain electrodes 502 and the pixel electrodes 601 as long as certain attaching areas exist between the corresponding drain electrode 502 and pixel electrode 601.

It should be noted that, as for the array substrate according to the embodiment of the present disclosure, an etching agent adopted in a patterning process for the pixel electrode layer is different from that adopted in a patterning process for the source-drain metal layer. Therefore, when the patterning process for the pixel electrode layer is performed, the etching agent can only etch a material of the pixel electrode layer, without damaging the source-drain metal layer. In this case, according to the embodiment of the present disclosure, the patterning process for the pixel electrode layer can be directly performed on the source-drain metal layer so as to directly form the pixel electrodes 601 on the drain electrodes 502.

Figure 2:
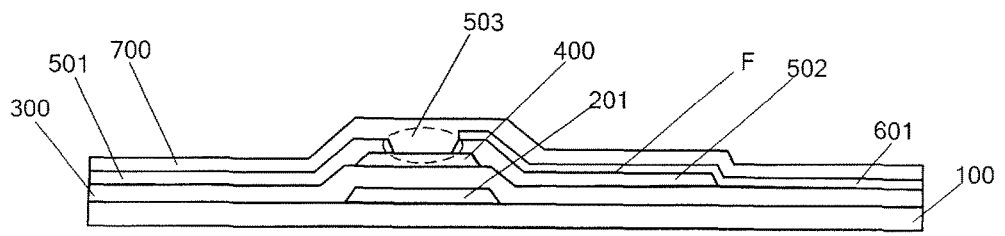
FIG. 2 is a structural schematic diagram of a partial section of an array substrate according to an embodiment of the present disclosure.

The corresponding pixel electrode 601 and the drain 502 are in direct physical contact with each other to form a contact interface S, referring to FIGS. 1 and 2. For example, the vertical projection of the contact interface S on the base substrate 100 is coincident with the overlap region of the vertical projections of the pixel electrode 601 and the drain 502 on the base substrate 100. Generally, the larger the attaching area between the pixel electrode 601 and corresponding drain electrode 502 of the thin film transistors is, the smaller the connecting resistance therebetween is. Therefore, referring to FIG. 2, for example, the pixel electrodes 601 cover the corresponding drain electrodes 502, so that the contact interface S between the pixel electrode 601 and the corresponding drain electrode 502 are the largest. For example, the pixel electrodes 601 cover the whole upper surface of the corresponding drain electrode 502. Thus, the connecting resistance between the pixel electrode 602 and the drain electrode 502 is the smallest, so as to furthest reduce electrical connecting consumption of electric energy provided by the thin film transistors, between the pixel electrodes 601 and the drain electrodes 502, and further improve the charging efficiency of the thin film transistor to the pixel electrode 601 to avoid insufficient charging to the pixel electrodes 601 and an disadvantageous influence on liquid crystal display.

Referring to FIG. 1 and FIG. 2, if impurities present among the pixel electrodes 601, when electrically connected with the pixel electrodes 601 in the array substrate and other elements, these impurities are easily subjected to electrochemical corrosion to damage the pixel electrodes 601 and other elements; meanwhile, these impurities may be electrically connected to form loops; if these loops are electrically connected with the drain electrodes 502, the pixel electrodes 601 and other elements, a large amount of electric energy provided by the thin film transistors is consumed; in addition, the impurities may establish loops among the pixel electrode 601 and other elements in the array substrate so that the above elements may be in short circuit, which leads to a less serious case that electric signals in the above elements are interfered, or a serious case that certain elements in the array substrate may be subjected to breakdown by a large current generated by the short circuit. Based on the above reasons, in the embodiment of the present disclosure, a passivation layer 700 is further arranged on the pixel electrode layer. The passivation layer 700 can be formed on the pixel electrode layer by depositing method. The passivation layer 700 fills slits among the pixel electrodes 601 and the other elements in the array substrate to enwrap elements such as the pixel electrodes 601 in the array substrate and most of impurities, so as to cause the impurities as well as the impurities and the elements in the array substrate to be insulated from one another, thus greatly reducing an electrochemical corrosion phenomenon caused by the impurities, avoiding consumption caused by the loops formed since the electric energy of the thin film transistors flows into the impurities, and further avoiding the short circuit among the pixel electrodes 601 on the array substrate and other elements due to the impurities. Therefore, the arrangement of the passivation layer 700 can greatly improve a qualified rate and service life of the array substrate.

Besides, in an array substrate of a related art, since the pixel electrode layer is arranged on the passivation layer, and when the patterning process of the pixel electrode layer is performed, some of the material of the pixel electrode layer is residual due to nonuniform etching (that is, a part of the pixel electrode layer that should be fully etched away remains). Therefore, the upper surface of the array substrate in the related art (the upper surface of the passivation layer with the pixel electrodes formed thereon) is poor in flatness. While in the embodiment of the present disclosure, the passivation layer covers the source-drain metal layer and the upper surface of the pixel electrode layer, that is the upper surface of the array substrate is covered by the passivation layer 700, so that the upper surface of the array substrate (namely the upper surface of the passivation layer 700) have a good flatness. Therefore, in a subsequent liquid crystal alignment process, an alignment film coated on the array substrate has better uniformity, thus reducing friction scraping to the alignment film caused by a friction alignment process, further causing the resulted array substrate to have better optical performances and finally leading to a better display effect of a liquid crystal display device.

Figure 3:
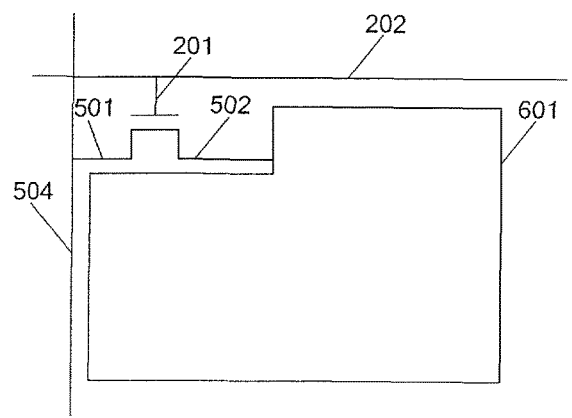
FIG. 3 is a structural schematic diagram of an array substrate according to an embodiment of the present disclosure.

Referring to FIG. 1 to FIG. 3, for example, a gate metal layer, a gate insulating layer 300 and an active layer 400 are sequentially stacked between the base substrate 100 and the source-drain metal layer. The gate metal layer includes a gate line 202 and the gate electrodes 201 electrically connected with the gate line; the source-drain metal layer includes a data line 504, the source electrode 501 electrically connected with the data line, and a trench 503 positioned between the source electrodes 501 and the drain electrodes

502. By the above arrangement, the gate electrode 201 in the gate metal layer, the active layer 400, the source electrode 501 and the drain electrode 502 in the source-drain metal layer and the channels 503 positioned between the source electrodes 501 and the drain electrodes 502 together form the thin film transistor. In such thin film transistor, the gate electrode 201 and the gate line 202 are electrically connected, the source electrode 501 and the data line 504 are electrically connected, and the drain electrode 502 and the pixel electrode 601 are electrically connected. Therefore, when an electric signal in the gate lines 202 flow into the gate electrodes 201, the channels 503 between the source electrodes 501 and the drain electrodes 502 in the thin film transistors are switched on, namely the thin film transistors are in an on state, so that the electric signals in the data line can be transmitted to the pixel electrode 601 by the thin film transistors to charge the pixel electrodes 601. Therefore, for example, an electric field between the pixel electrodes 601 and corresponding common electrode on an counter substrate is generated, and by deflecting liquid crystal molecules in a liquid crystal region corresponding to the pixel electrode 601 controlled by the electric field, liquid crystal display is finally realized.

In an example, in a direction perpendicular to the base substrate 100, the pixel electrode 601 and the drain electrode 501 overlapped with each other, and no insulating layer exists between the pixel electrodes 601 and the drain electrodes 502.

In an example, the pixel electrodes 601 and the drain electrodes 502 are electrically connected.

In an example, the pixel electrodes 601 and the drain electrodes 502 are in direct physical contact to form a contact interface F.

In an example, a vertical projection of the contact interface F on the base substrate coincides with an overlapping region of vertical projections of the pixel electrode 601 and the drain electrode 502 on the base substrate 100.

Figure 4:
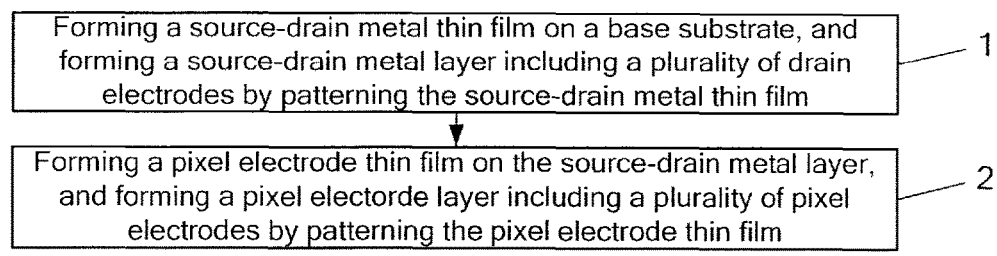
FIG. 4 is a flow chart of a manufacturing method of an array substrate according to another embodiment of the present disclosure.

Referring to FIG. 4, an embodiment of the present disclosure further provides a manufacturing method of the array substrate according to any technical solution described above, which comprises:

Step 1: forming a source-drain metal thin film on a base substrate, and forming a source-drain metal layer including a plurality of drain electrodes by patterning the source-drain metal thin film.

For example, when manufacturing the array substrate, a plurality of functional thin films (including the source-drain metal thin film and a pixel electrode thin film in a following step 2) need to be formed on the base substrate, and respective functional layers including various elements are formed by the functional thin films by corresponding patterning processes. Before forming the source-drain metal layer, the functional thin films such as a gate metal thin film, a gate insulating thin film and an active thin film are sequentially laminated on the base substrate, and patterning processes of respective functional thin films are also required to be performed, so as to form a gate metal layer including a gate line and a gate electrode electrically connected with the gate line from the gate metal thin film, and form a source-drain metal layer including a data line, a source electrode electrically connected with the data line and trench positioned between the source electrodes and the drain electrodes from the source-drain metal thin film. The gate electrode, the active layer, the source electrode, and the drain electrode as well as the channels positioned between the source electrode and the drain electrode form the thin film transistor used for charging a pixel electrode formed hereinafter.

Step 2: forming a pixel electrode thin film on the source-drain metal layer, and forming a plurality of pixel electrodes corresponding to the drain electrodes respectively by patterning the pixel electrode thin film, wherein the corresponding pixel electrodes and drain electrodes are attached to each other.

For example, an indium tin oxide thin film is deposited on the base substrate first, and then a pixel electrode layer patterning process is used for forming a plurality of pixel electrodes.

Through the above process steps, the pixel electrodes and the corresponding drain electrodes of the thin film transistors are electrically connected, thus charging the pixel electrodes by the thin film transistors, further generating an electric field between the pixel electrodes and corresponding common electrodes on a color film substrate, and controlling liquid crystal molecules in a liquid crystal region corresponding to the pixel electrodes to deflect to realize liquid crystal display.

In the manufacturing method of the array substrate according to the embodiment of the present disclosure, the drain electrodes in the source-drain metal layer and the pixel electrodes in the pixel electrode layer of the array substrate are attached. Compared with the related art that a passivation layer is formed between the drain electrodes and the pixel electrodes and the drain electrodes and the pixel electrodes are electrically connected through via holes in the passivation layer, the drain electrode in the source-drain metal layer and the pixel electrode in the pixel electrode layer in the embodiment of the present disclosure is directly attached, without being electrically connected through the via holes in any passivation layer. Therefore, a problem of overlarge resistance of the electrically connected positions between the drain electrodes and the pixel electrodes due to too small or irregularly shaped via holes on the passivation layer is avoided, thus solving a problem of lower charging efficiency to the pixel electrodes by the thin film transistors caused by the larger resistance of the electrically connected positions between the drain electrodes and the pixel electrodes and enabling a liquid crystal display device to have a better display effect.

An embodiment of the present disclosure further provides a liquid crystal panel, comprising the array substrate according to any technical solution described above.

For example, in an example, the liquid crystal panel further comprises a counter substrate opposite to the array substrate and a liquid crystal layer arranged between the array substrate and the counter substrate.

For example, the counter substrate is a color filter substrate with a color filter formed thereon.

The liquid crystal panel according to the embodiment of the present disclosure has advantages same as those of the array substrate according to any technical solution described above, which will not be repeated herein.

An embodiment of the present disclosure further provides a liquid crystal display device, comprising the liquid crystal panel according to the above technical solution.

The liquid crystal display device further comprises a backlight unit arranged on a side of the array substrate of the liquid crystal panel and used for providing backlight for the liquid crystal display panel.

The liquid crystal display device according to the embodiment of the present disclosure has advantages same as those of the above liquid crystal panel, which will not be repeated herein.

Respective embodiments in the description are progressively described, same or similar parts of the respective embodiments can be referred to for each other, and each embodiment emphasizes a difference from other embodiments. Particularly, since the method embodiment is basically similar to the product embodiments, the method embodiment is simply described and related parts can refer to the part of description of the product embodiments.

Although the embodiments of the disclosure has been described above in great detail with general descriptions and specific embodiments, various changes and improvements may be made on the basis of the embodiments of the disclosure, which is apparent to those skilled in the art. Therefore, all such changes and improvements without departing from the spirit of the disclosure are within the scope of the claims of the disclosure.

The application claims priority of Chinese Patent Application No. 201510314353.3 filed on Jun. 9, 2015, the disclosure of which is incorporated herein by reference in its entirety as part of the present application.

The invention claimed is:

1. An array substrate, comprising a base substrate, a drain electrode and an active layer of a thin film transistor and a pixel electrode corresponding to the drain electrode arranged on the base substrate, wherein the pixel electrode and the drain electrode are attached to each other, wherein, in a direction perpendicular to the base substrate, the active layer and the pixel electrode overlap with each other.

2. The array substrate according to claim 1, wherein, the pixel electrode covers the drain electrode.

3. The array substrate according to claim 1, wherein, a passivation layer is further arranged on the pixel electrode layer and the passivation layer covers upper surfaces of the drain electrode and the pixel electrode.

4. The array substrate according to claim 1, further comprising a gate line, a data line, a gate electrode, a gate insulating layer, source electrode and an active layer of the thin film transistor arranged on the base substrate, wherein the gate electrode and the gate line are electrically connected and the source electrode and the data line are electrically connected.

5. The array substrate according to claim 1, wherein, in a direction perpendicular to the base substrate, the pixel electrode and the drain electrode overlapped with each other, and no insulating layer is present between the pixel electrode and the drain electrode.

6. The array substrate according to claim 1, wherein, the pixel electrode and the drain electrode are electrically connected.

7. The array substrate according to claim 1, wherein, the pixel electrode and the drain electrode are in direct physical contact to form a contact interface therebetween, a vertical projection of the contact interface on the base substrate coincides with an overlapping region of vertical projections of the pixel electrode and the drain electrode on the base substrate.

8. A manufacturing method of the array substrate, comprising:

forming a drain electrode and an active layer of a thin film transistor on a base substrate; and forming a pixel electrode the drain electrode, corresponding to the drain electrode, so that the pixel electrode and the drain electrode are attached to each other, wherein, in a direction perpendicular to the base substrate, the active layer and the pixel electrode overlap with each other.

9. A liquid crystal panel, comprising the array substrate according to claim 1.

10. A liquid crystal display device, comprising the liquid crystal panel according to claim 9.

* * * * *